United States Patent [19]
Leslie

[11] Patent Number: 5,996,127
[45] Date of Patent: Dec. 7, 1999

[54] WEARABLE DEVICE FOR FEEDING AND OBSERVING BIRDS AND OTHER FLYING ANIMALS

[76] Inventor: David M. Leslie, 3430 List Pl., Apt.1004, Minneapolis, Minn. 55416

[21] Appl. No.: 09/099,708

[22] Filed: Jun. 19, 1998

[51] Int. Cl.6 ....................................................... A42B 1/24
[52] U.S. Cl. .................................. 2/422; 2/410; 2/209.13; 119/715; 446/27
[58] Field of Search .......................... 2/4, 6.2, 10, 209.13, 2/410, 421, 422, 909, 199, 411; 119/429, 714, 715, 853; 446/27; D2/246

[56] References Cited

U.S. PATENT DOCUMENTS

| | | | |
|---|---|---|---|
| D. 287,061 | 12/1986 | Bound | 446/27 |
| D. 341,911 | 11/1993 | Thomsen . | |
| 3,813,016 | 5/1974 | Bohannan | 2/422 |
| 4,079,940 | 3/1978 | Arakaki | 2/185 |
| 4,268,918 | 5/1981 | Lee . | |
| 4,675,916 | 6/1987 | Orsini . | |
| 4,760,610 | 8/1988 | Wu et al. . | |
| 4,905,406 | 3/1990 | Warner | 2/422 |
| 5,107,796 | 4/1992 | Embrey . | |
| 5,181,139 | 1/1993 | Benitez | 2/422 |
| 5,226,180 | 7/1993 | Leach | 2/411 |
| 5,530,970 | 7/1996 | Knutson | 2/209.13 |
| 5,675,841 | 10/1997 | Jackson | 2/209.13 |

*Primary Examiner*—Michael A. Neas
*Assistant Examiner*—Gary L. Welch
*Attorney, Agent, or Firm*—Merchant & Gould P.C.

[57] ABSTRACT

A device for feeding and observing flying animals comprising a hat, a support mounted on the hat and extending outward from the hat, and a feeder mounted on the support. When flying animals feed from the feeders, a person wearing the hat may observe them from a short distance. The device may comprise a helmet with three poles mounted on it and extending outward from the helmet, and a feeder hanging from each of the poles. A variety of flying animals, including butterflies, hummingbirds, and other small birds, may be observed with the device.

25 Claims, 1 Drawing Sheet

5,996,127

WEARABLE DEVICE FOR FEEDING AND OBSERVING BIRDS AND OTHER FLYING ANIMALS

BACKGROUND OF THE INVENTION

Traditionally, bird feeders hang from trees or other supports. For example, hummingbirds have been fed by hanging nectar feeders on a stand or from a tree. A number of other bird feeders holding seeds or other kinds of bird food are well known. Most bird feeders are relatively stationary once they have been installed at a particular location. Moving the feeder to a different position will involve finding a proper stand or tree branch to hang the feeder from.

Hummingbirds and other small birds are enjoyable to observe from a very close distance in order to get a good view of the birds. The ideal place for mounting a bird feeder may not always present the best place for the observer to stand or sit and watch the birds. Persons with a sincere and deep-rooted interest in birds often share an urge to be as close to the birds as possible when observing them.

Much of the above applies just as well to other flying animals, such as other kinds of birds or, for example, butterflies. The person interested in watching these animals feed has previously had to bring a chair or equivalent to a suitable location where the animals are expected to feed. The difficulties in obtaining closeness and the restrained mobility are obstacles hindering the person from practicing the hobby or profession of animal observation.

There is a need for a feeding and observation device for flying animals which provides the user with improved mobility as well as close-up observation of the birds.

SUMMARY OF THE INVENTION

The invention relates to a device for feeding and observing flying animals comprising a hat, a support mounted on the hat and extending outward from the hat, and a feeder mounted on the support. When flying animals feed from the feeders, a person wearing the hat may observe them from a relatively short distance, for example, of about 6–18 inches.

A preferred embodiment of the invention comprises a helmet with three poles mounted on it and extending outward from the helmet, and a feeder hanging from each of the poles.

BRIEF DESCRIPTION OF THE DRAWINGS

The invention may be more completely understood by considering the detailed description of various embodiments of the invention which follows in connection with the accompanying drawings in which.

Figure 1:
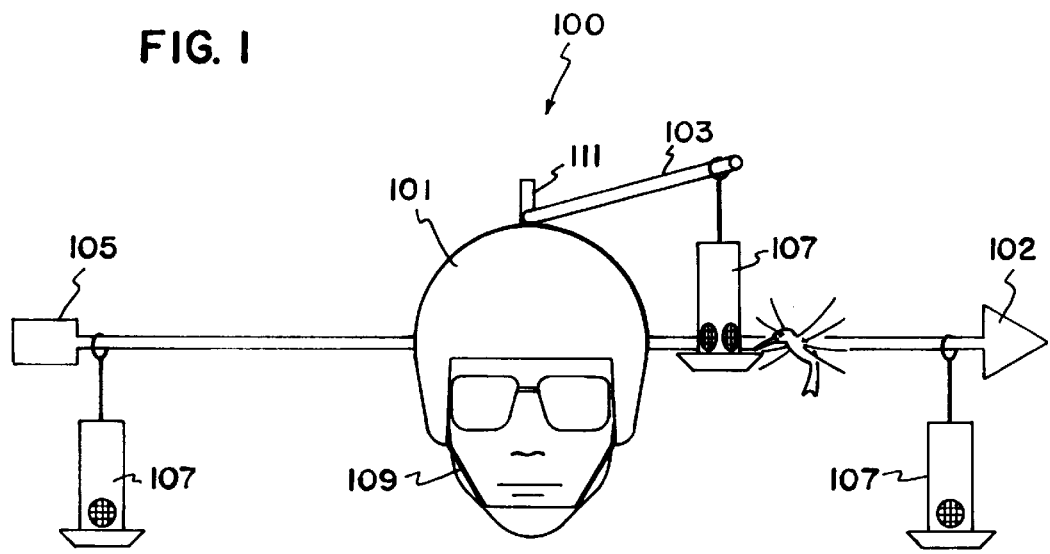
FIG. 1 is a perspective front view of an embodiment of a device according the invention.

While the invention is amenable to many modifications and alternative forms, specifics thereof have been shown by way of example in the drawings and will be described in detail. It should be understood, however, that the intention is not to limit the invention to the particular embodiment described. On the contrary the intention is to cover all modifications equivalents and alternatives following within the spirit and scope of the invention as defined by the appended claims.

DETAILED DESCRIPTION OF THE DRAWINGS

The present invention allows the feeding and close observation of hummingbirds and a number of other flying animals while wearing the device of the invention. Though not so limited, flying animals include birds, smaller nectar-feeding birds in particular, such as hummingbirds, and also a variety of other flying animals such as butterflies, and small seed eating birds such as chickadees and titmice. An appreciation of various aspects of the invention is best gained through a discussion of various application examples.

FIG. 1 shows a first embodiment of the device 100 according to the invention. A person is wearing a hat 101, secured with a chin strap 109. Many different types of hats can be used with the invention. A helmet made from molded plastic with internal padding provides good comfort for the wearer. The helmet provides a good outer surface for the mounting of the various devices on the outside, as will be further described below. For example, a motorcycle helmet or an ice hockey helmet would be suitable for use with invention. Although a helmet is shown in the drawings, many other hats are available that would fit to a wearer's head securely enough to support the weight of a small feeder, possibly with the assistance of a rear strap or counterweight The outside of the hat 101 may be used to attract the birds. A hat 101 with a red color will help attract the attention of hummingbirds. The chin strap 109 may for example be a common chin strap that comes with the hat 101. Optionally, the chin strap 109 may be a strap of leather, fabric, or plastic that is mounted to the hat 101 by the user.

Several mounts may be attached to the hat 101. In the illustrated embodiment, at least one pole 103 is mounted on the hat 101 using known techniques. Side poles 102 and 105 may also be mounted to the hat 101. For example, the poles 102, 103, and 105 may be attached to the hat by bolts going through the hat. Optionally, a pole may enter the helmet from one side and exit on the other side, whereby a single pole will extend in two directions from the hat. Preferably, the poles 102, 103, and 105 are mounted on the hat such that they can be removed without using tools. The length of the poles 102, 103, and 105 will be chosen depending on how close the user wants to be to the flying animals. For example, the poles 102, 103, and 105 may extend about 6 to 18 in. from the hat 101. The horizontal angle between poles 102, 103, and 105 will be selected in consideration of how many poles are used, and where the user wants to have the feeders while using the device. In many applications, the angle in a horizontal plane between the poles range from about 30 to 60 degrees.

A feeder 107 is mounted to the pole 103. If additional poles 102 and 105 are used, a feeder 107 may be mounted on each additional side pole 102 and 105. Many types of feeders can be used with this invention. For attracting nectar-feeding birds such as hummingbirds and orioles, the feeder may be a nectar feeder of a bright color, or displaying nectar of a bright color. Feeders filled with seed will attract chickadees and titmice, and other birds. The feeders may for example be provided with handles, whereby they can be mounted on the poles 102, 103, and 105 by hanging the handle over the poles. A top receptacle 111 is mounted on top of the hat 101 that may be used for supporting, for example, a perch or an ornament, such as a flag or a streamer.

Figure 2:
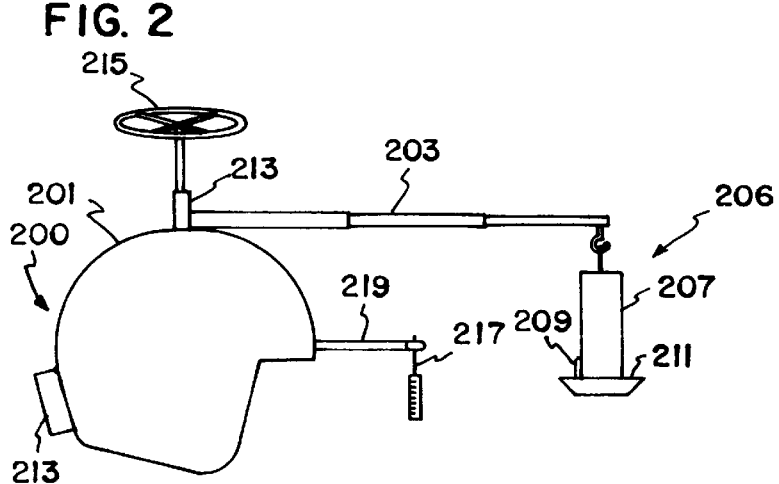
FIG. 2 is a side view of a second embodiment of the device according to the invention.

A second embodiment 200 of the present invention is shown in FIG. 2. The hat 201 is provided with a telescoping pole 203. Only one telescoping pole 203 is shown in this embodiment, but several telescoping poles 203 may be mounted on the hat, extending in different directions. Well-known telescoping poles may be used in this embodiment that include cylinders of increasing diameter, able to slide inside each other to achieve a compact size or extend to a maximum length. The telescoping pole 203 may be attached to the hat 201 using known techniques, such as bolting the pole 203 to the hat 201. Preferably, the telescoping pole 203 is mounted on the hat 201 such that it can be removed by hand.

At the end of the telescoping pole 203 farthest from the hat, a nectar feeder 206 may be mounted by use of a hook on the telescoping pole 203. The nectar feeder 206 may, for example, include a reservoir nectar 207, a feed access opening 209 on the reservoir, and a perch 211 adjacent the feed access opening 209. Many different, commercially available, nectar feeders 206 can be used with this embodiment. Seed feeders are also commercially available in a wide variety of designs that are appropriately sized for use with the invention.

A counterweight 213 may be provided at the back of hat 201. The counterweight may consist of a piece of a relatively heavy material, which is attached to the hat 201. The counterweight 213 is positioned at the back lower part of the helmet, and serves to counterbalance the weight of the telescoping pole 203 and the nectar feeder 206 or other feeders. The counterweight may also be used to stabilize the device while the user is mounting or removing the nectar-feeder 206 from the pole. The weight of the counterweight 213 will be chosen in consideration of the weight and length of the telescoping pole 203, and of the weight of the nectar feeder 206 and other feeders. It should be noted that depending on how closely the hat fits on the head of the person using the device, the friction between the hat 201 and the person's head may reduce or even eliminate the need for any counterbalancing measures.

A perch apparatus 215 may be mounted on the hat 201 by the top receptacle 216. The perch apparatus may consist of a horizontal bar arrangement supported from a vertical stand attached to the top receptacle 216. The perch apparatus 215 may be used as a waiting place for the birds while they wait to gain access to the feeders 206.

In FIG. 2 a magnifying glass 217 is mounted on the hat 201 by a mounting means 219. The mounting means 219 may extend outward from the hat 201 and may be attached to the hat 201, for example, by a bolt. The mounting means 219 may support the magnifying glass 217 for example by clamping the handle of the magnifying glass. The mounting means 219 is preferably adjustable such that the magnifying glass 217 can be positioned at many locations between the wearer and the nectar feeder, enabling a focused magnified image of the birds. Many different commercially available magnifying glasses 217 are usable with this embodiment of the invention. Alternatively, other optical devices such as a camera, video recorder, or optical lenses may be mounted on the hat 201.

Figure 3:
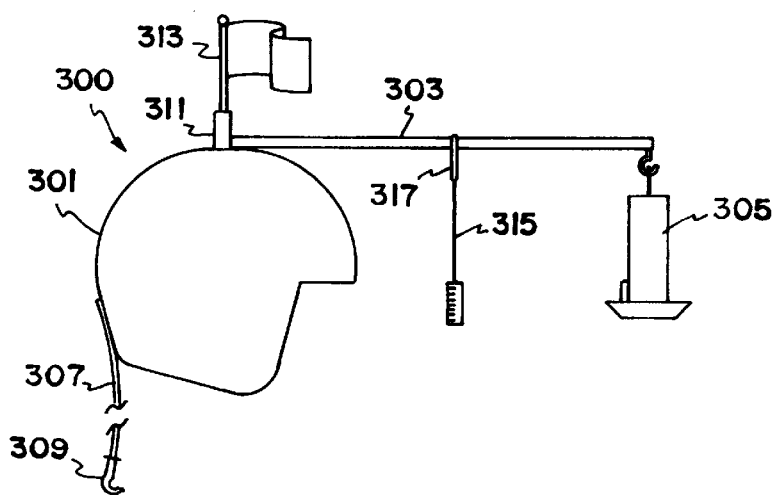
FIG. 3 is a side view of a third embodiment of the device according to the invention.

A third embodiment 300 of the invention is shown in FIG. 3. The device 300 comprises a hat with a pole 303 mounted on the hat 301 such that it extends forward. Only one pole 303 is shown in this embodiment, but several poles 303 may be mounted on the hat, extending in different directions. Preferably the pole 303 is mounted on the hat 301 such that it is removable by hand. A feeder 305 is mounted on the pole 303 by a hook. A rear strap 307 with a hook 309 is mounted at the back of hat 301.

The strap 307 is used to prevent the helmet 301 from tipping forward with the weight of the feeder 305. Many different kinds of straps can be used with this embodiment. For example, the rear strap 307 may be a fabric strap, a plastic strap or a leather strap. The rear strap 307 and the hook 309 may be used to engage the wearer's clothing, such as a belt or belt loop, during use of the device. By hooking the rear strap 307 onto the clothing, the wearer can counteract any tipping of the hat caused by the weight of the pole 303 and the feeder 305. The rear strap 307 may also be used to provide stability when the user is mounting or removing the feeder 305. The length and configuration of the rear strap 307 and the hook 309 will be chosen depending on the circumstances of each application, such as the wearer's height, the weight of the pole 303 and the feeder 305, and the length of the pole 303. As noted above, friction between the hat 301 and the wearer's head may reduce or even eliminate the need for any counterbalancing measures, such as the rear strap 307. The rear strap 307 may be attached to the hat 301 using known techniques. For example, the rear strap 307 may be attached by an adhesive or by a bolt that enters the hat 301.

An ornament 313 may be mounted on the hat 301 by the top receptacle 311. The ornament 313 may be, for example, a flag, streamer or a perch. Optionally, the ornament 313 may be an arrangement of a light, thin material that moves easily in the wind, such that the ornament 313 may be used to attract the attention of the birds from a distance.

A magnifying glass 315 is mounted on the pole 303 by a mounting means 317 that may engage the pole 303 in different ways. For example, the mounting means 317 may clamp around the pole 303, or hang from the pole 303 by a hook at its end. Preferably the height, angle and/or location of the magnifying glass 315 with respect to the user can be adjusted by use of the mounting means 317. This allows the user to adjust the magnifying glass 315 for an optimal view of the feeding birds on the nectar feeder 305.

A detailed description of the use of one embodiment of the invention will now be described. The user will typically put on the hat before the nectar feeders or seed feeders are mounted on the poles extending from the hat. The user puts on the hat 101 and adjusts any chin strap or rear strap that it may be provided with, such that the hat sits properly on the head. The user prepares the kind of food that will be used in the feeders. For example, the food may be bird seeds or nectar. Nectar may for example be obtained, as is well known, by mixing one portion of sugar and four portions of water, or other suitable proportions. The user may sit down in a chair or position himself or herself at a suitable location based, for example, on feeding habits and abundance of local birds or butterflies. The user then attaches the feeders to the poles extending from the hat. If, for example, the feeders are attached by use of hooks or the like, this is an easy procedure and the feeders can conveniently be attached one feeder at a time, until a feeder is mounted on every pole extending from the hat. Alternatively, the feeders may be mounted on the poles before the user puts on the hat. The order of many of these steps may be varied, depending on the desired effect.

The user then waits for the flying animals to appear and start feeding from the feeders. Depending on how much noise the user has made prior to this moment, and depending on the natural shyness of the kinds of birds or other flying animals to be observed, it may take a longer or shorter period of time before the animals appear. When the birds start feeding from the feeders hanging in the user's view, the user can conveniently observe the birds from a close distance as they are feeding. When the user is done observing the birds, he or she first removes the feeders from the poles, and then removes the hat from his or her head. Alternatively, the user may take off the hat and then remove the feeders from the poles. Transportation of the device to and from the observation place is convenient because the poles may be removed from the device when not in use. Similarly, transportation is convenient when using telescoping poles that may be pushed into the helmet.

Various applications will be apparent to the hobbyist interested in watching and photographing animals at close range and to professionals interested in photography and wildlife biology. For example, a magnifying glass may permit reading numbers on small tags or bands attached to butterflies or hummingbirds, respectively, under scientific study. A camera or a video camera may be used for highly detailed recording of animals as well as their sounds and songs.

The various embodiments described above are provided by way of illustration only and should not be construed to limit the invention. Those skilled in the art to which the invention most closely pertains will readily recognize various modifications and changes that may be made to the present invention without strictly following the exemplary embodiments and applications illustrated and described herein, and without departing from the true scope of the present invention that is set forth in the following claims.

I claim:

1. A device for feeding and observing flying animals comprising:
    a hat, the hat including a front portion and a rear portion;
    a first support mounted on the hat and extending forward of the front portion of the hat; and
    a feeder configured to contain food for flying animals mounted on the first support, wherein the flying animals can be observed while they feed.
2. The device of claim 1, wherein the hat is a helmet.
3. The device of claim 1, wherein the hat further comprises a chin strap.
4. The device of claim 1, wherein the hat further comprises a rear strap, for securing the device by engaging a wearer's clothing.
5. The device of claim 1, wherein the hat further comprises a counterweight capable of counterbalancing a weight of the support and feeder.
6. The device of claim 1, wherein the support comprises a pole.
7. The device of claim 6, wherein the pole is a telescoping pole.
8. The device of claim 6, wherein the pole is removably mounted on the hat.
9. The device of claim 6, wherein the pole further comprises a hook for mounting the feeder on the pole.
10. The device of claim 6, wherein the pole extends about 6 to 18 inches from the hat.
11. The device of claim 1, further including a second and a third support mounted on the hat and extending outward from the hat, a second feeder mounted on the second support, and a third feeder mounted on the third support.
12. The device of claim 11, wherein the first support extends forward from the hat, and the second and third supports are mounted on each side of the first support.
13. The device of claim 12, wherein the second and third supports are disposed at an angle ranging from about 30 to 60° from the first support.
14. The device of claim 1, wherein the feeder is a nectar feeder.
15. The device of claim 1, wherein the feeder is a seed feeder.
16. The device of claim 1, further comprising a receptacle on the hat for attaching auxiliary devices.
17. The device of claim 16, wherein the auxiliary device is a perch apparatus.
18. The device of claim 16, wherein the auxiliary device is an ornament.
19. The device of claim 1, further comprising an optical device mounted on the hat.
20. The device of claim 19, wherein the optical device is selected from the group consisting of a magnifying glass, a camera, and a video camera.
21. The device of claim 1, further comprising a optical device mounted on the support.
22. The device of claim 21, wherein the optical device is selected from the group consisting of a magnifying glass, a camera, and a video camera.
23. A device for feeding and observing flying animals comprising:
    a hat, including a front portion and a rear portion;
    a first pole mounted on the hat and extending forward of the front portion of the hat;
    a second pole and a third pole mounted on the hat on each side of the first pole and extending outward from the hat; and
    first, second, and third feeders mounted on the first, second, and third poles, respectively, wherein the first pole is positioned so that the first feeder is visible to a wearer of the hat, whereby the flying animals can be observed while they feed.
24. A device for feeding and observing flying animals comprising:
    a helmet with a chin strap;
    a first pole mounted on the helmet and extending forward from the helmet, and a second and third poles mounted on the helmet on each side of the first pole and extending outward, wherein the poles have hooks; and
    a nectar feeder mounted on each of the first, second, and third poles by the hooks, whereby the flying animals can be observed while they feed.
25. A device for feeding and observing flying animals comprising:
    a hat;
    a first telescoping pole mounted on the hat and extending outward from the hat; and
    a feeder configured to contain food for flying animals mounted on the first telescoping pole, whereby the flying animals can be observed while they feed.

* * * * *